(12) United States Patent
Rumiantsau et al.

(10) Patent No.: US 11,449,496 B2
(45) Date of Patent: Sep. 20, 2022

(54) ENHANCED NATURAL LANGUAGE PROCESSING WITH SEMANTIC SHORTCUTS

(71) Applicant: ServiceNow, Inc., Santa Clara, CA (US)

(72) Inventors: Mikhail Rumiantsau, Mountain View, CA (US); Aliaksei Vertsel, Mountain View, CA (US)

(73) Assignee: ServiceNow, Inc., Santa Clara, CA (US)

(*) Notice: Subject to any disclaimer, the term of this patent is extended or adjusted under 35 U.S.C. 154(b) by 404 days.

(21) Appl. No.: 16/664,382

(22) Filed: Oct. 25, 2019

(65) Prior Publication Data

US 2021/0124736 A1 Apr. 29, 2021

(51) Int. Cl.
*G06F 16/00* (2019.01)
*G06F 16/242* (2019.01)
*G06F 16/248* (2019.01)
*G06F 40/247* (2020.01)
*G06F 40/205* (2020.01)
*G06F 40/30* (2020.01)
*G10L 15/22* (2006.01)
(Continued)

(52) U.S. Cl.
CPC .......... *G06F 16/243* (2019.01); *G06F 16/248* (2019.01); *G06F 40/205* (2020.01); *G06F 40/247* (2020.01); *G06F 40/30* (2020.01); *G10L 15/22* (2013.01); *G10L 15/26* (2013.01); *G10L 15/30* (2013.01); *G10L 2015/223* (2013.01)

(58) Field of Classification Search
CPC combination set(s) only.
See application file for complete search history.

(56) References Cited

U.S. PATENT DOCUMENTS 6,081,774 A * 6/2000 de Hita ............... G06F 16/3344
707/E17.058
6,609,122 B1 8/2003 Ensor
(Continued)

OTHER PUBLICATIONS

Alaiaksei Vertsel et al.; "Pragmatic approach to structured data querying via natural language interface", ARZIV.Org, Cornell University Library, Jul. 2, 2018, XP081241106 (8 pgs.).
(Continued)

*Primary Examiner* — Yicun Wu
(74) *Attorney, Agent, or Firm* — Fletcher Yoder PC

(57) ABSTRACT

An example embodiment may involve a software application executable on computing devices of a remote network management platform and a computation instance associated with a managed network. The computational instance may contain a database storing data of the managed network. The software application may receive, from a client device of the managed network, a natural language query (NLQ), and retrieve Backus-Naur form (BNF) rules and a set of metadata associated with the BNF rules. The metadata may include a text-based description of a schema of the database and abbreviations associated with the BNF rules. The NLQ may be parsed using the BNF rules together with the metadata by applying the metadata during parsing to extend the BNF rules. A query object based on the parsed query may be generated, and the database searched using the query object. A result of the search may be transmitted to the client device.

20 Claims, 11 Drawing Sheets

(51) Int. Cl.
*G10L 15/26* (2006.01)
*G10L 15/30* (2013.01)

(56) References Cited

U.S. PATENT DOCUMENTS

| | | | |
|---|---|---|---|
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,610,512 | B2 | 10/2009 | Gerber |
| 7,617,073 | B2 | 11/2009 | Trinon |
| 7,689,628 | B2 | 3/2010 | Garg |
| 7,783,744 | B2 | 8/2010 | Garg |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |
| 9,557,969 | B2 | 1/2017 | Sharma |
| 9,792,387 | B2 | 10/2017 | George |
| 10,044,566 | B1 | 8/2018 | Grisco et al. |
| 2002/0143524 | A1* | 10/2002 | O'Neil ............ G06F 16/3334 704/9 |
| 2008/0040496 | A1 | 2/2008 | Zhao et al. |
| 2019/0272296 | A1* | 9/2019 | Prakash ........... G06F 16/24534 |
| 2020/0097472 | A1* | 3/2020 | Vertsel ............ G06F 16/90332 |

OTHER PUBLICATIONS

International Search Report and Written Opinion for PCT Application No. PCT/US2020/056895 dated Jan. 28, 2021 (12 pgs.).
Context-Free Grammars, 6 pages.
Regular Expressions (Regex) Tutorial, Nov. 2018, 11 pages.

* cited by examiner

ENHANCED NATURAL LANGUAGE PROCESSING WITH SEMANTIC SHORTCUTS

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

Many services and interfaces that a remote network management platform provides can be database-driven. That is, such services and interfaces can involve the remote network management platform retrieving data for users, often in response to user queries. Thus, the efficiency in which the remote network management platform retrieves and otherwise manages its data can impact the effectiveness of such services and interfaces.

SUMMARY

In managed networks, particularly large-scale managed networks with hundreds or thousands of users and computing devices and thus large amounts of data (e.g., terabytes), databases are frequently searched by a variety of users to obtain desired data. For example, there can be hundreds or thousands of searches per day across the managed network. Furthermore, the type of data searched, the amount of data searched, the manner in which the data is organized and stored, and the manner in which users attempt to search for data can change over time and can also vary per user, per department, per application or service being used for searching, or vary in another manner across the managed network.

As data searches within the managed network increase and/or otherwise change in complexity or frequency, it can be difficult for the remote network management platform to provide services that efficiently and consistently parse user queries and obtain desired results. To address these and other issues, the methods and systems described herein provide a remote network management platform that is configured to enable natural language processing of user requests (e.g., queries) for data and other information managed by the remote network management platform for the managed network.

Accordingly, a first example embodiment may involve a system comprising: a remote network management platform associated with a managed network and containing a computational instance, wherein the managed network comprises a client device, and wherein the computational instance contains a database from which information associated with the managed network can be delivered to the client device; a software application, executable on a one or more computing devices of the system, and configured to cause the one or more computing devices to: receive, from the client device, a natural language query (NLQ); retrieve from data storage associated with the computational instance (i) one or more Backus-Naur form (BNF) rules corresponding to a formal query language and (ii) a set of metadata associated with the one or more BNF rules, wherein the metadata includes a text-based description of both a schema of the database and one or more abbreviations associated with at least one of the one or more BNF rules; parse the NLQ using the one or more BNF rules together with the metadata, wherein the metadata is applied during parsing to extend the one or more BNF rules without modifying the one or more BNF rules; generate a query object in the formal query language, based on the NLQ as parsed; search the database using the query object as a search query; and transmit, to the client device, a result of the search query.

A second example embodiment may involve a method performed by a method performed by a software application executable on one or more computing devices of a system comprising a remote network management platform associated with a managed network and containing a computational instance, the method comprising: receiving, from a client device of the managed network, a natural language query (NLQ), wherein the computational instance contains a database from which information associated with the managed network can be delivered to the client device; retrieving from data storage associated with the computational instance (i) one or more Backus-Naur form (BNF) rules corresponding to a formal query language and (ii) a set of metadata associated with the one or more BNF rules, wherein the metadata includes a text-based description of both a schema of the database and one or more abbreviations associated with at least one of the one or more BNF rules; parsing the NLQ using the one or more BNF rules together with the metadata, and applying the metadata during parsing to extend the one or more BNF rules without modifying the one or more BNF rules; generating a query object in the formal query language, based on the NLQ as parsed; searching the database using the query object as a search query; and transmitting, to the client device, a result of the search query.

In a third example embodiment, an article of manufacture including a non-transitory computer-readable medium, having stored thereon program instructions that, upon execution by one or more computing devices of a system comprising a remote network management platform associated with a managed network and containing a computational instance, cause the system to perform operations comprising: receiving, from a client device of the managed network, a natural language query (NLQ), wherein the computational instance contains a database from which information associated with the managed network can be delivered to the client device; retrieving from data storage associated with the computational instance (i) one or more Backus-Naur form (BNF) rules corresponding to a formal query language and (ii) a set of metadata associated with the one or more BNF rules, wherein the metadata includes a text-based description of both a schema of the database and one or more abbreviations associated with at least one of the one or more BNF rules; parsing the NLQ using the one or more BNF rules together with the metadata, and applying the metadata during parsing to extend the one or more BNF rules without modifying the one or more BNF rules; generating a query object in the formal query language, based on the NLQ as parsed; searching the database using the query object as a search query; and transmitting, to the client device, a result of the search query.

In a fourth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
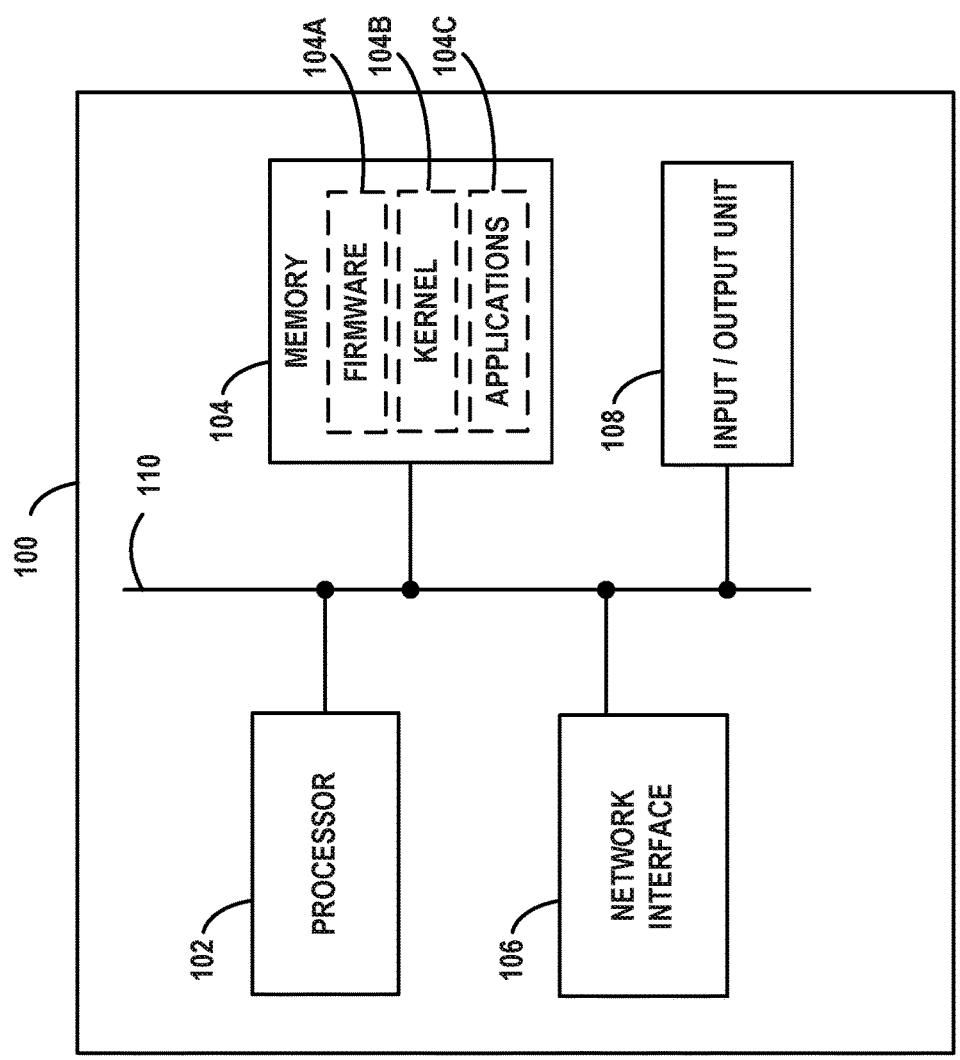
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
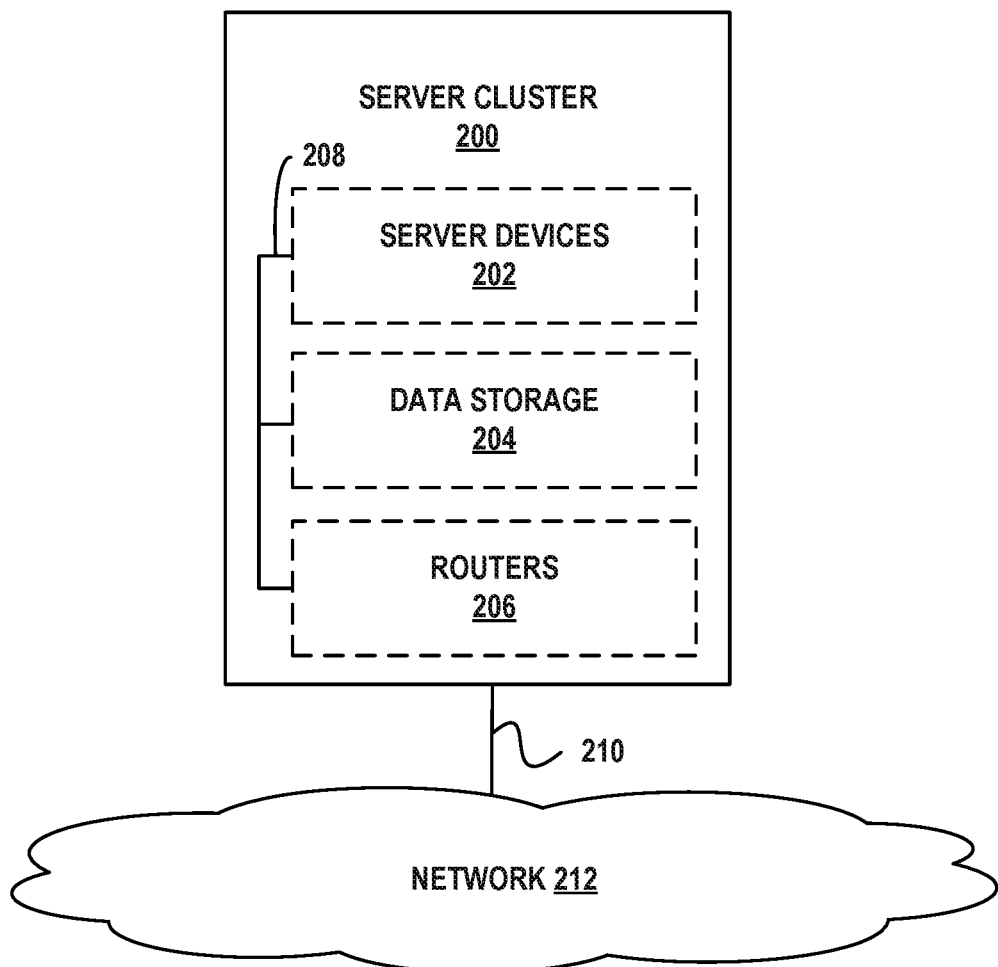
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
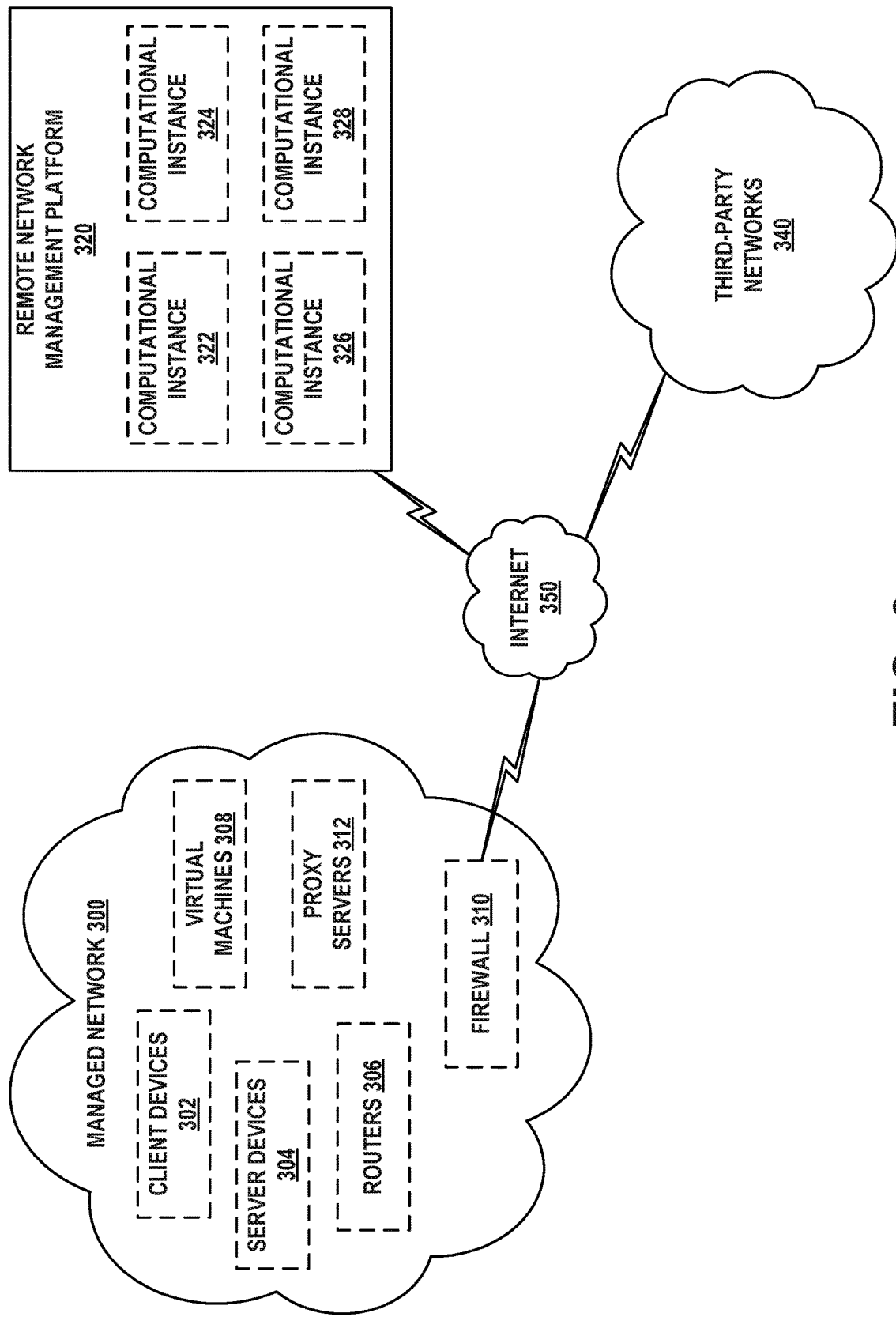
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
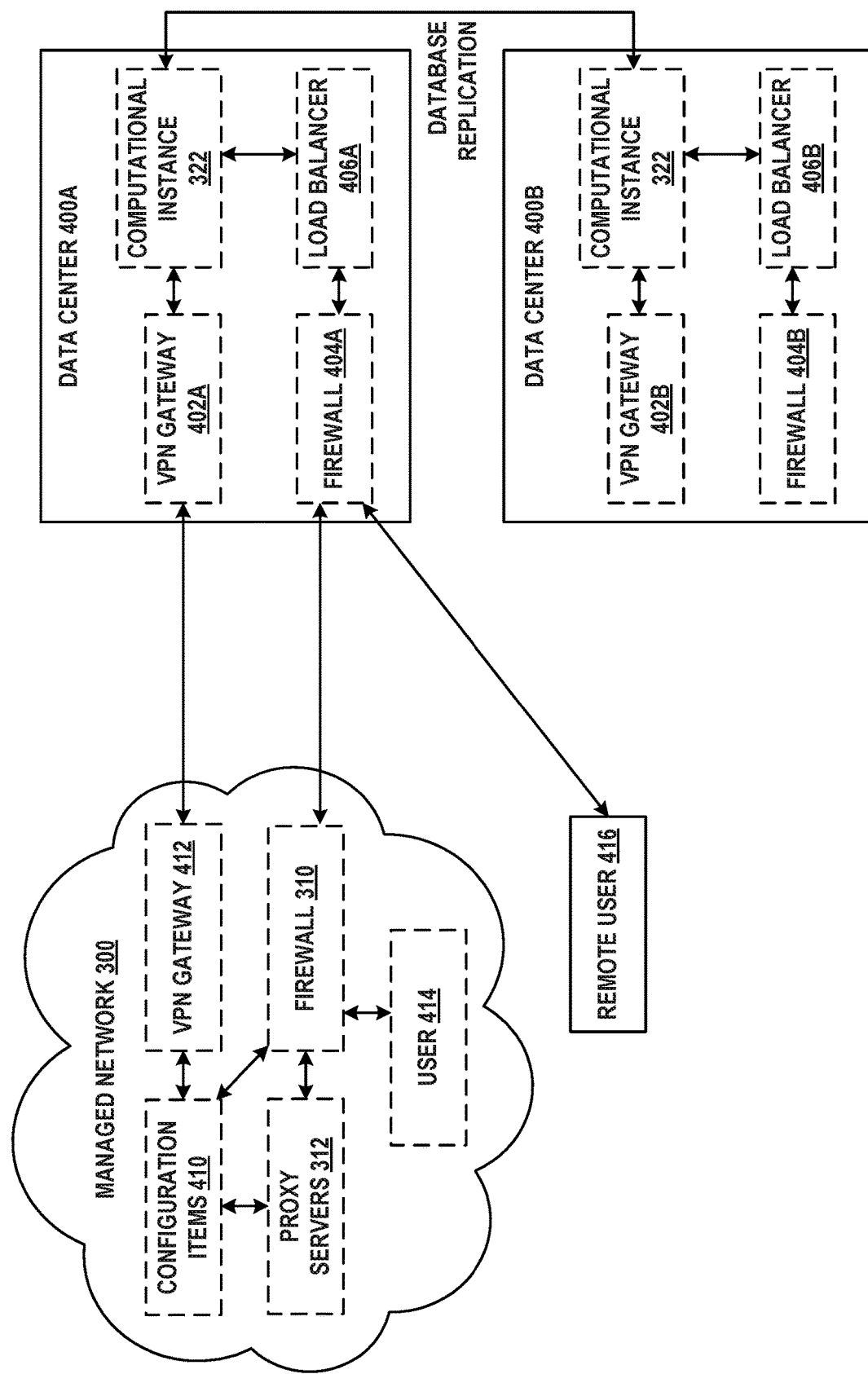
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
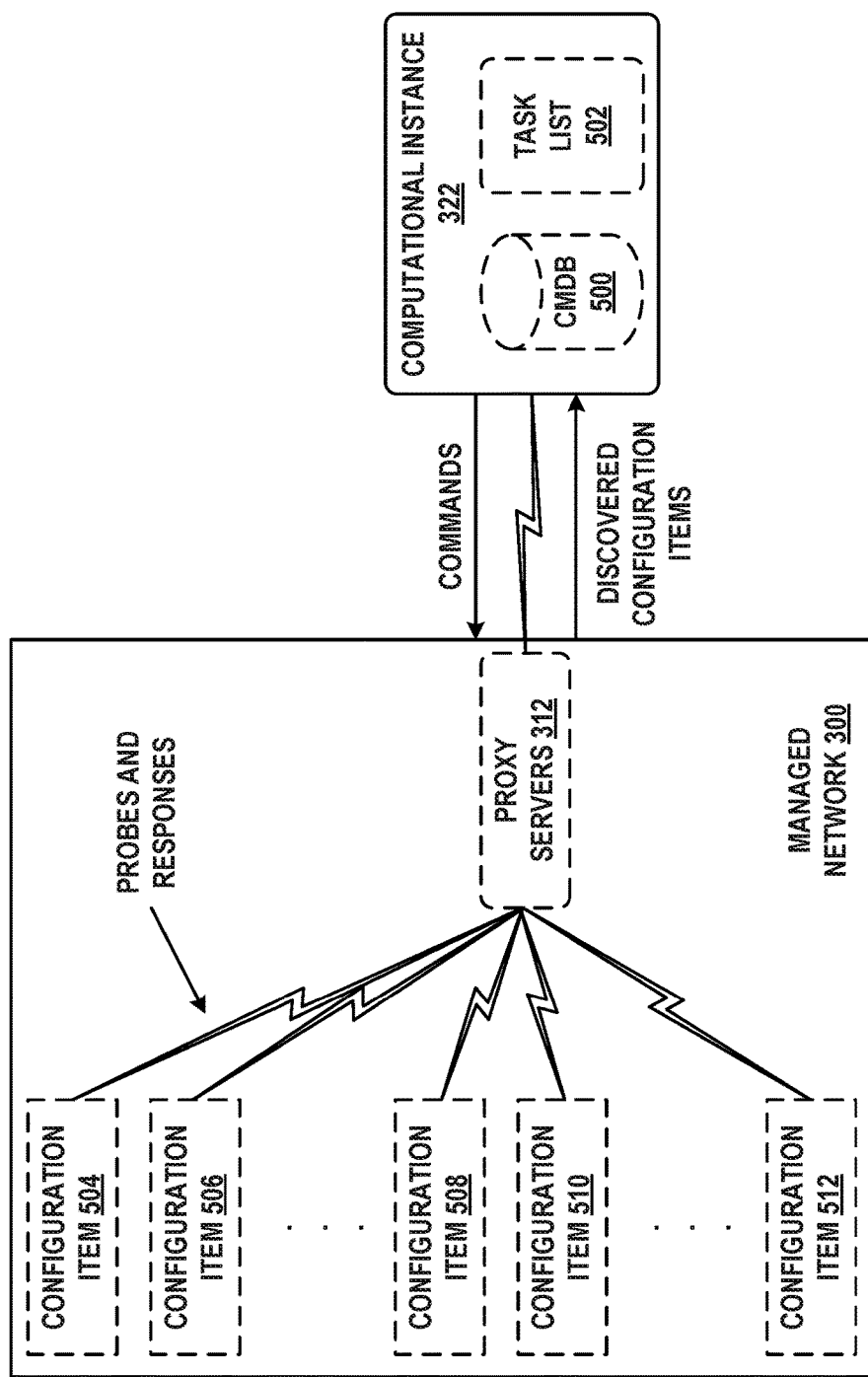
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
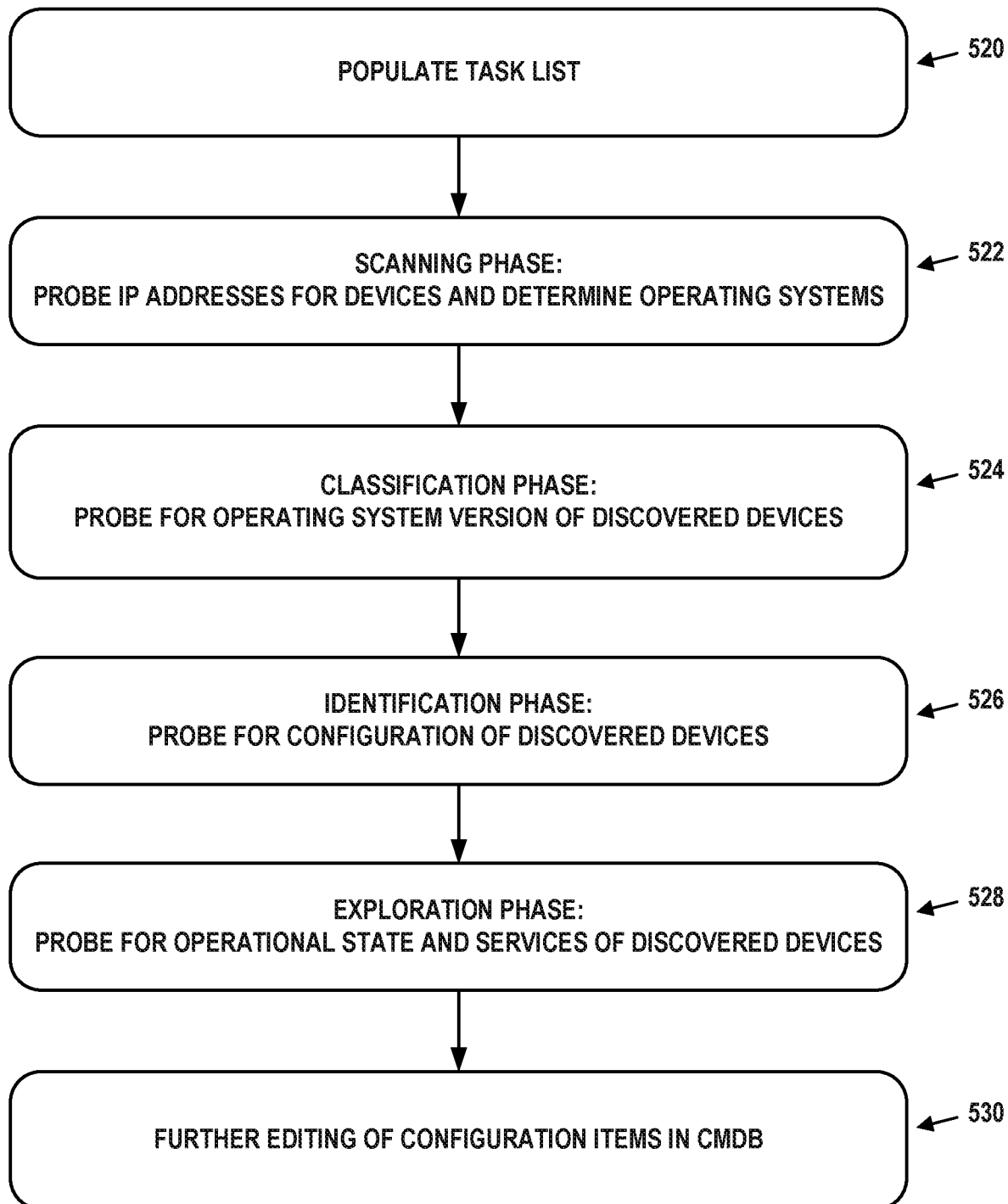
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE GRAMMARS AND QUERY PARSING

Examples related to query parsing will be described herein primarily in the context of a managed network and a remote network management platform, such as managed network 300 and remote network management platform 320. However, these examples can also be applied at a more general level outside of this particular context, such as user queries made with an Internet search engine.

It can be desirable for a remote network management platform to provide an efficient, consistent, and secure means for storing, retrieving, and otherwise managing data, particularly large-scale enterprises with hundreds or thousands of users and computing devices and thus large amounts of data (e.g., terabytes) that need to be managed. Efficient, consistent, and secure data management can affect the efficiency, consistency, and overall quality of the services, interfaces, and other functions that the remote network management platform provides.

One aspect of data management is the ability to efficiently retrieve data requested by a user in a query, particularly when there is a large amount of data through which to search for the specific information that the user seeks. At a high level, for example, this can involve a computing device receiving a text query from a user, processing the query, and using the processed query to retrieve data from one or more databases and provide the data as a search result for the user. However, for various reasons, including those described below in this section, some manners of processing user queries, and thus retrieving data that the user desires, can be challenging, time consuming, or otherwise inefficient.

One manner of processing user queries involves the concept of keyword searching. In systems that support keyword searching, a keyword-based query is received from a user and searched in one or more index databases. Keyword-based search engines interpret the user query by focusing only on identifiable keywords. Because of this, the keyword-based search engines can produce unsatisfactory search results, often returning irrelevant data. Further, in some cases, excessive amounts of data (e.g., millions of documents) are retrieved in response to a simple keyword query, which often makes it difficult for a user to find the needed information. The undesirable performance of keyword-based search engines can at times be attributable to it being difficult for keywords to capture and understand complex search semantics that a user seeks to express in the query. Rather, keyword-based search engines can often interpret the user query without ascribing any content to the form and expression entered by the user.

To address this problem with keyword searching, some search engines can utilize techniques beyond keywords. For example, such search engines can capture and understand more complex search semantics the user seeks to express. To that end, these search engines can attempt to characterize the user's query in terms of predefined frequently asked questions (FAQs), which can be manually indexed from user logs along with corresponding answers. One key characteristic of FAQ searches is that they take advantage of the fact that commonly asked questions are much fewer than total number of questions. By referencing logs of questions that were previously asked by users, FAQ-based search engines can compute which questions are most commonly asked. Further, with FAQ-based search engines, a level of indirection is added by asking the user to confirm one or more rephrased questions in order to find an answer.

Unfortunately, however, FAQ-based search engines can also be limited in their understanding the user's query because the FAQ-based search engines might only look up frequently occurring words in the query, and might not perform any deeper syntactic or semantic analysis. While FAQ-based search engines have improved search precision, there may still remain a need for further improvement in processing user queries.

One way of defining natural language words within a user query so that the query's words are more meaningful, and capturing the relationship between the natural language words and phrases within the query, can be to use a parser to parse the query. For example, the parser can determine the structure of the query, determine relationships between words, phrases, and/or characters in the query, and build a representation of the syntax of the query that a computing device can understand. To facilitate this, a parser can apply context-free grammars to the query. Some such grammars can be written using Backus normal form (BNF) (also known as Backus-Naur form), which is a notation technique (also referred to as a "metalanguage") that can be used to formally define a grammar so that it is ideally unambiguous during parsing of the query as to which portions of the query should undergo further processing and which portions of the user query should be rejected, ignored, etc. Such grammars will be referred to herein as BNF grammars.

A BNF grammar can be made up of a set of grammar rules (also referred to herein as "rules," for short, or "productions"). Rules can be written in accordance with a particular metasyntax, which describes the allowable structure and composition of phrases and sentences written in BNF. The metasyntax for BNF can include "terminal symbols" (or "terminals," for short) and "non-terminal symbols" (or "non-terminals," for short). Terminals can include characters, strings, and/or digits that are non-ambiguously defined and to which no rules are applied. Non-terminals, on the other hand, are more like variables in the sense that a given non-terminal is defined in terms of terminals, the non-terminal itself (e.g., in recursive situations), and/or other non-terminals. In other words, for a rule that provides a definition for a non-terminal, other rules must be sought in order to determine what the non-terminal is.

As such, each BNF grammar rule can have a left-hand side and a right-hand side. The left-hand side can include a non-terminal. The right-hand side can be an expression that provides the non-terminal's definition in terms of terminals, the non-terminal itself, and/or other non-terminals.

Consider, for example, an example BNF grammar, made up of the following two rules:
INTEGER::=DIGIT INTEGER DIGIT
DIGIT::=0|1|2|3|4|5|6|7|8|9

In this and other examples herein, non-terminals will be denoted either by being written in all capital letters or surrounded by angled brackets, the definitional operator "::=" will be used to separate a non-terminal from the non-terminal's definition, and the operator "|" (which provides a logical OR) will be used in definitions where appropriate. It should be understood, however, that rules can be written in other manners as well. For example, non-terminals could appear in bold text, and the definitional operator ":" could be used instead of "::=".

Here is an example of how the two rules noted above can be expressed in plain English when read left to right:
An INTEGER is comprised of (or "defined as") a DIGIT, or an INTEGER and (or "followed by") a DIGIT.
A DIGIT is comprised of a 0, 1, 2, 3, 4, 5, 6, 7, 8, or 9.

Using this BNF grammar, consider a situation in which the string, 312, appeared in a query. The parser may determine which rule(s) to apply to the string, and in doing so, can attempt to determine whether 312 is a DIGIT or an INTEGER and a DIGIT. Because 312 is not a DIGIT, it might be an INTEGER followed by a DIGIT, in which case the INTEGER is 31 and the DIGIT is 2. Further, because 31 is not a DIGIT, it too might be an INTEGER followed by a DIGIT, in which case the INTEGER is 3 and the DIGIT is 1. Finally, the INTEGER, 3, is a DIGIT. The preceding parsing of the string, 312, thus produces the parse tree illustrated in FIG. 6A. Once this information is obtained, the information can then be passed to another routine or computing device for further processing.

Figure 6A:
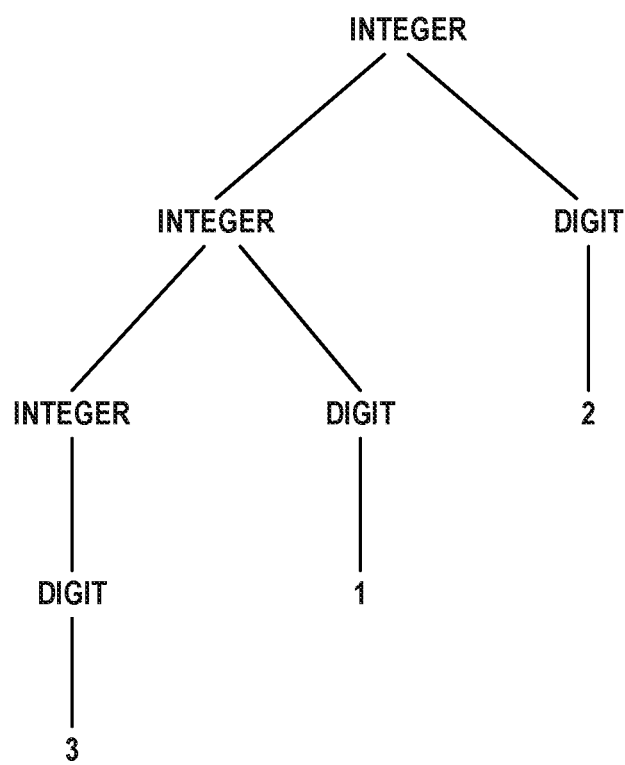
FIG. 6A is a parse tree produced using a BNF grammar, in accordance with example embodiments.
Figure 6B:
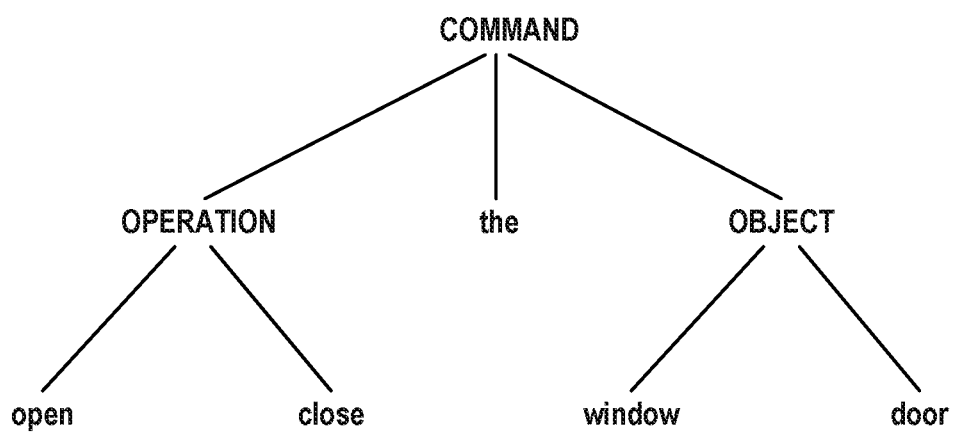
FIG. 6B is a parse tree produced using a BNF grammar, in accordance with example embodiments.

FIG. 6B is another example parse tree produced in accordance with the following example BNF grammar:

COMMAND::=OPERATION the OBJECT
OPERATION::=open|close
OBJECT::=window|door

In this example, the rules contain definitions for three non-terminals, namely, OBJECT, OPERATION, and COMMAND. According to this BNF grammar, there are two possible objects ("window" and "door"), two possible operations ("open" and "close"), and thus four possible commands ("open the window", "close the door", "open the door", and "close the window"). Therefore, when a computing device receives the phrase, "open the window," in a query, the computing device can interpret the word "open" to be an OPERATION and can interpret the word "window" to be an OBJECT. The phrase then becomes "OPERATION the OBJECT", which the rules define as a COMMAND. Thus, using the BNF grammar, the computing device can determine that the phrase "open the window" is a COMMAND, where the OPERATION="open" and the OBJECT="window." Once this information is obtained, the information can then be passed to another routine or computing device for further processing. Other example BNF grammars and parse trees are possible as well.

Unfortunately, there are some disadvantages of using BNF grammars to parse queries. While BNF grammars can provide translations for user queries that are meaningful and reflect the relationships between the elements of such queries, BNF grammars might not provide mechanisms for enhancements, such as the addition of new BNF grammars. Additionally, BNF grammars might use a dictionary or library to define terms and grammars. While the BNF grammar itself might not change frequently, the terms and synonyms that originate from the outside of a BNF grammar dictionary or library of words and phrases can change over time. For example, grammar words, phrases, or rules can change based on new user data, query logs, and the like. In these and other scenarios, however, the BNF grammars might not provide a mechanism to update and change the words, phrases, and grammars without an administrator having to structurally modify the BNF definition itself—namely, a modification to the BNF grammars or library of the BNF.

Regardless of which type of formal grammars are used when parsing a query, a structure of a sentence in a query can affect how the parser interprets the relationship between words in the sentence. For example, with sentences having a simple structure, such as "The dog likes treats," traditional algorithms can correctly interpret the relationship between the words because there are not multiple combinations of words to parse. However, with more complex sentence structures, traditional algorithms can provide multiple combinations of words, thus making it more difficult to determine the most likely combination.

When there are multiple combinations to choose, a "penalty-based" population technique can be used to narrow down the multiple combinations to fewer combinations. The "penalty-based" population technique can analyze a sentence from left to right based on a set of rules that define words and phrases in a particular order. For example, a user may input the sentence "this is a simple test". The parser may then apply the following BNF grammar to the sentence:

QUERY::=LEFT MIDDLE RIGHT
LEFT::=this|this is
MIDDLE::=is a|a simple
RIGHT::=simple test|test Using this BNF grammar, there are numerous ways to break down the sentence. For example, the sentence can be interpreted as "this" "is a" "simple test" or it can be interpreted as "this is" "a simple" "test".

To narrow down the combinations to a combination that is most likely the proper interpretation of the sentence, the parser may calculate a set of penalties. For example, the LEFT, MIDDLE, and RIGHT definitions have penalties associated with them. Each penalty is associated with the index of the OR clause firing for each of the LEFT, MIDDLE, and RIGHT definitions, wherein the first OR clause carries a penalty of zero, the second OR clause carries a penalty of one, etc.

Referring back to the "this is a simple test" example, the parse of LEFT="this", MIDDLE="is a", RIGHT="simple test", is a solution with a penalty of zero. Each word or phrase of the parse (i.e. "this", "is a", "simple test") is part of the first OR clause in the rules. In contrast, the parse of LEFT="this is", MIDDLE="a simple", RIGHT="test" would have a penalty score of 3 because "this is" is a second OR clause with a penalty of 1, "a simple" is a second OR clause with a penalty of 1, and "test" is a second OR clause with the penalty of 1 (i.e., 1+1+1=3). Thus, the parse having the penalty of zero would be chosen as the most likely proper interpretation of the sentence.

However, a penalty of zero might not always be possible. For example, suppose the parser applies the following BNF grammar to the sentence "this is a simple test":

QUERY::=LEFT MIDDLE RIGHT
LEFT::=this is|this
MIDDLE::=is a|a simple
RIGHT::=simple test|test In this example, a penalty of zero is not possible with the parse of LEFT="this is", MIDDLE="is a", RIGHT="simple test", because the sentence is not "this is is a simple test". Instead, the combination with the lowest penalty would be LEFT="this", MIDDLE="is a", RIGHT="simple test" with the penalty of 1. Thus, in these and other examples where there are numerous manners in which to interpret a query, penalties might not be as sufficient as desired for ascertaining the intended interpretation of the query.

VI. EXAMPLE NATURAL LANGUAGE QUERY PARSING AND PROCESSING

In accordance with example embodiments, and as described by way of example above, a remote network management platform may include or contain a computational instance (also referred to as a "customer instance") that is associated with a managed network. The managed network could, for example, support the mission and operations of an enterprise. The computational instance may include one or more databases configured for managing data relating to and/or supporting various aspects of remote management of the managed network. Non-limiting examples of management data may include data relating to network operations, such as performance, problem detection and/or isolation, and health monitoring. Non-limiting examples of management data may include data relating to the mission and operations of the enterprise, such as inventory tracking, customer support, and sales and customer orders, among others. Access to the databases of a managed network may be required for a wide variety of functions, and may involve complex searches that apply multi-dimensional conditions, criteria, and/or strategies. Personnel that need access to the database(s) may include network support personnel, such as staff of an IT department. Personnel may also include employees of the enterprise who carry out the mission and operations of the enterprise by managing inventory, placing and tracking orders, and providing support to customers of the enterprise, for example.

In a network managed by a remote network management platform, particularly large-scale managed networks with hundreds or thousands of users and computing devices and thus large amounts of data (e.g., terabytes), databases are frequently searched by a variety of users to obtain desired data. For example, there may be hundreds or thousands of searches per day across the managed network. In addition, the type of data searched, the amount of data searched, the manner in which the data is organized and stored, and the manner in which users attempt to search for data can vary per user, per department, per application or service being used for searching, or otherwise vary across the managed network and can also change over time. For example, users in an IT department of the enterprise might perform complex searches in attempting to resolve incident requests submitted for other users. As another example, software asset management administrators might perform complex searches in attempting to gather and concisely organize license information so that accurate determinations of compliance can be made. Other examples are possible as well. In practice, a database search typically begins with a user query, followed by parsing and processing the user query in order to form or generate a formal database query that may be input to a database, and, ultimately (or at least eventually) leading to one or more formal query results that are returned to the user.

At a high level, parsing and processing of a user query based on a context-free grammar such as BNF may be described as a process by which a sequence of words that makes up the query is analyzed according to one or more applicable BNF rules in order to construct a parse tree, as described by way of example above in connection with FIGS. 6A and 6B. Individual words or text (or character) items of the user query may form the leaf nodes of the tree, and branches leading to the root node traverse intermediate nodes that may represent elements of the BNF rule (or rules). By analyzing the rules traversed in the parse tree, the meaning of the query as entered by the user can be mapped to formal query terms and syntax, in order to translate the user's query into a formal language of a formal database query. One of the challenges of this approach is that, even when a user forms a query that is knowingly targeted to a specific and relatively bounded realm of relevant data and selection criteria (e.g., data related to an enterprise associated with a managed network), the user's natural language with which the query is expressed may still exceed the boundaries of the BNF rules in terms of vocabulary and syntax, for example. As a result, user queries entered or provided in natural language may not be able to be parsed in compliance with the BNF rules, and thus may fail to map to a formal database query. As data searches within the managed network increase in number and/or otherwise change in complexity or frequency, it can be increasingly difficult for the remote network management platform to provide services that efficiently and consistently parse user queries and obtain desired results.

Accordingly, disclosed herein is a remote network management platform that implements techniques for parsing queries that users may enter or provide in their natural language. In particular, a software application executable on one or more computing devices of the remote network management platform can be configured to extended BNF grammar rules in order to more efficiently represent and/or accommodate natural languages and allow BNF grammar words and/or phrases, to be added seamlessly without having to structurally and/or functionally modify the BNF rules themselves. The one or more computing devices may be part of, or included in, a computational instance associated with a particular managed network, and/or may be more broadly part of the remote network management platform and operational in the service of more than one computational instance of the remote network management platform. Other configurations of the one or more computing devices may be possible as well.

In accordance with example embodiments, extensions to BNF grammar rules (or to other context-free grammars) make take the form of metadata that represents the schema of a database in a textual form that may be interpreted within the framework of user query parsing according to the BNF rules. Advantageously, the metadata may be created or generated by translating identities, specifications, and/or definitions of database tables, columns, rows, entries, etc., as well as parametrized relations between them into text that may be interpreted as conditions and/or search criteria in the context of a formal database query language. The metadata may also be indirectly "embedded" in the BNF grammar rules in such a manner (e.g., via pointers or links to one or more metadata files) that enables expansion of the applicable scope of the BNF grammar rules, without changing or modifying the grammar rules themselves.

Further, the metadata may also include a flexible scheme translating and/or mapping a wide and evolving array of natural language words and/or expressions to formal database query terminology through the parsing process. More specifically, example embodiments provide expansion of metadata that may represent formal database query input data in abbreviated forms referred to herein as "synonyms" and "semantic shortcuts." Briefly, in the context of metadata, a synonym is a natural language word or phrase that may be used in equivalence to a formal term of a context-free grammar rule, which may be mapped by parsing to input of a formal database query. Similarly, a semantic shortcut is a natural language word or phrase that may be used in equivalence to a formal condition or criterion of a context-free grammar rule, which also may be mapped by parsing into of a formal database query. During parsing, synonyms and/or semantic shortcuts encountered in a user query may be replaced by their known equivalents, thereby rendering the user query compliant with applicable BNF rules, and enabling proper parsing.

In example embodiments described herein, metadata is thus used to extent BNF grammar rules in two ways. One way is to express a database schema, including tables, rows, and columns, in textual form. This enables the BNF rules to reference the database schema indirectly, without having to "hardwire" the schema into the BNF rules. The other way is to accommodate a broad range users' natural language(s) in the BNF rules, thereby relaxing constraints on users' query vocabularies that might otherwise require a high degree of database expertise on the part of users. In particular, the implementation of synonyms and sematic shortcuts may be considered as enabling "natural language queries" or "NLQs."

A further advantage of using metadata to extend context-free grammars for query parsing and processing is that it enables rapid expansion and/or adaptation that may be customized or tailored to specific environments. For example, when applied to database schema, new and/or modified tables may be accommodated by updating metadata, without having to change BNF rules. When applied to synonyms and/or semantic shortcuts, new abbreviations can similarly be added or revised without changing BNF rules. This may allow the same BNF rules to be applied to different geographic regions of an enterprise, where local natural language customs may be used. Even different working groups within an enterprise may employ different terminology to mean the same thing at the formal query level.

As an example, a NLQ might be entered by a user as "show recent open p1 incidents." In parsing this NLQ, the term "p1" may be interpreted as a semantic shortcut, and replaced by an equivalent phrase "priority=1" from a metadata file containing semantic shortcuts. Similarly, the phrase "recent incidents" may be interpreted as a semantic shortcut, and replaced by an equivalent phrase "sort by create_date descending" from a metadata file containing semantic shortcuts. These are just two illustrative examples.

Figure 7:
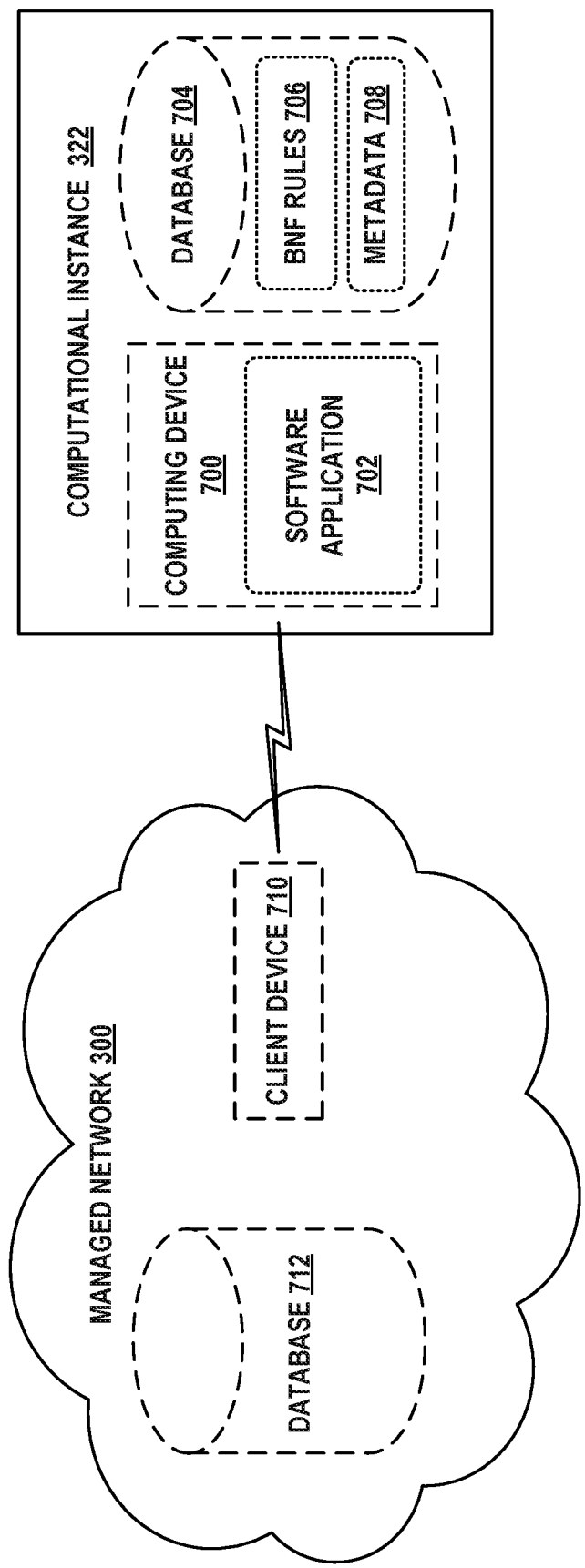
FIG. 7 depicts a communication environment in which a software application can receive and process natural language queries, in accordance with example embodiments.

FIG. 7 depicts an example communication environment in which a software application can receive and process NLQs in order to provide search results to client devices of managed network 300. As shown, computational instance 322 (of remote network management platform 320) can include a computing device 700 on which software application 702 is executable. Software application 702 can include one or more parsing modules (hereinafter referred to as "parsers") configured to parse queries using BNF grammars or other types of grammars.

Computational instance 322 can also include a database 704, which can store BNF grammars 706 (including improved extensions thereof) and metadata 708. Database 704 can be a local database of computing device 700 or a database contained at a different computing device of computational instance 322.

BNF grammars 706 can include at least one set of rules, some of which might correspond to a distinct human language and/or a distinct country. BNF grammars 706 can be downloaded and updated over the Internet or entered and updated by an administrator or other user of managed network 300 or remote network management platform 320.

Metadata 708 can be in various forms, such as XML, HTML, or JavaScript Object Notation (JSON). As will also be discussed in more detail below, software application 702, or a parser thereof, can include a module configured to load, examine, and utilize metadata 708 that is in XML, HTML, JSON, and/or one or more other forms.

Database 704 can be CMDB 500 or a separate database. Database 704 can also store a variety of other searchable data associated with managed network 300, such as incident reports, financial data, and identifiers of users of managed network 300, among many other possibilities.

As further shown, computing device 700 can be in communication with a representative client device 710 of managed network 300. Managed network 300 can also include its own database 712, which can store the same metadata 708 as database 704, or a portion thereof. Like database 704, database 712 can also store a variety of other searchable data associated with managed network 300, such as incident reports, financial data, and identifiers of users of managed network 300, among many other possibilities.

Using client device 710, a user can access software application 702, which can provide client device 710 with a user interface that enables the user to enter a NLQ, transmit the query to computing device 700, receive search results associated with the query from computing device 700, and view the search results.

When a user inputs a query or a portion thereof via client device 710, client device 710 can transmit the query to computing device 700, which can trigger computing device 700 to perform various actions. As an example, such actions can include, for example, (i) retrieving BNF grammars 706 to be used in parsing the query, (ii) parsing the query by applying BNF grammars 706 to the query, (iii) generating a "query object" based on the parsing, where the query object is in a form associated with a specific search format for a particular database, databases, or the Internet, such as SQL or XML, (iv) searching database 704, database 712, another database, or the Internet using the query object as a formal search query (the formal search query being a different from the NLQ), and (v) transmitting, to client device 710, a result of the search query. Note that the term "query object" for a formal query in a formal database query language is used to capture the complex formal structure that is typical of a formal query language, such as multiple fields and/or nested structures.

In accordance with example embodiments, computing device 700 can analyze the received query before parsing the query (or passing the receive query to a parsing application). Such initial analysis may be considered "pre-processing." In practice, an NLQ may be received in the form a text string. Pre-processing may then entail identifying individual words, possibly providing the user with suggested corrections for apparent typographical errors, and preparing the string for parsing.

The computing device may then access or retrieve BNF grammar examples described above and as well as metadata. By applying BNF grammars 706, together with the metadata, to the query, computing device 700 can parse the query into a parsing tree that can have one or more paths, each path corresponding to a respectively different interpretation of the query that can be used to generate a respective query object to be used to perform the search.

In accordance with example embodiments, various approaches may be used in parsing to determine the best or most likely parse tree and interpretation. By way of example, computing device 700 can apply a "left-to-right greedy matching" technique. As an example of how this technique is performed, consider again the following example BNF grammar.

QUERY::=LEFT MIDDLE RIGHT
LEFT::=this|this is
MIDDLE::=is a|a simple
RIGHT::=simple test|test In this example, the rules for non-terminals LEFT, MIDDLE, and RIGHT each have two definitions. For example, LEFT has a definition of "this is" or "this," MIDDLE has a definition of "is a" or "a simple," and RIGHT has a definition of "simple test" or "test." Thus, a first path in the parse tree can include LEFT="this is," MIDDLE="a simple," and RIGHT="test," and a second path in the parse tree can include LEFT="this," MIDDLE="is a," and RIGHT="simple test."

As a general matter, given a non-terminal having multiple different definitions in its expression, the concept of left-to-right greedy matching involves prioritizing the leftmost definition for the non-terminal. For example, for LEFT, the leftmost definition is "this," and thus, "this" would be prioritized over the next leftmost definition, "this is." Thus, "this" would be selected as the definition for LEFT over "this is," and, in turn, it follows that MIDDLE would match with "a simple" and RIGHT would match with "test." As such, the designer of this BNF grammar or a user thereof can count on this particular interpretation of the query being matched. Computing device 700 can then generate a query object based on this matching of the query and perform a search (e.g., of one or more of database 704 or database 712, or the Internet) using the query object as a search query.

As noted above, computing device 700 can be configured to implement improved, extended BNF grammar rules that more efficiently represent natural languages and allow BNF grammar words, phrases, and rules to be added seamlessly without having to structurally modify the BNF itself.

To facilitate this, BNF grammars 706 can include a set of extended BNF grammar rules that can be stored externally from the parser itself, separately from other BNF grammars, so that the set of extended BNF rules can be dynamically loaded by the parser without changing the BNF itself. In some implementations, the set of extended BNF rules can be a global set of extended BNF rules that can be downloaded or otherwise accessible to and used by various managed networks. Alternatively, the set of extended BNF rules can be specifically tailored to an entity associated with a particular managed network (e.g., managed network 300). When computing device 700 parses a received query, computing device 700 can retrieve the set of extended BNF rules (e.g., from database 704) along with, or separate from, other BNF grammars that can be used to parse the query.

In some implementations, one or more rules of the set of extended BNF rules can include a regular expression. Such rules can thus allow more seamless joining of complete words and regular expressions. For example, a rule can define a date as having the following format.

DATE_YYYY_MMDD::=\d\d\d\d[-]\d\d[-]\d\d

This example rule includes a variety of occurrences of a wildcard character, \d. A wildcard character can serve as a placeholder that can be interpreted as a number of literal characters or an empty string. In particular, in this example, \d can designate, and thus can be replaced by, any digit from 0 to 9. As such, when the query includes a date written in a 4-digit year, 2-digit month, and 2-digit day format, the wildcard characters allow the parser to correctly identify the date.

As another example, a rule can define a five and nine digits zip code as having the following format, where \d can designate a digit.

ZIP_CODE::=\d\d\d\d\d|\d\d\d\d\d[-]\d\d\d\d

In other examples, a regular expression could include other wildcard characters as well, such as \u to designate an upper-case letter, \l to designate a lower-case letter, \p to designate a punctuation mark, an underscore, _, to designate any single word, an asterisk, *, to designate any single character and/or one or more repetitions of an expression, and/or \nd to designate any number, n, of digits, among other possibilities.

As a more particular example, the following rules can define a full name as either having a first name and a last name or a first name, middle initial, and last name, where (i) a first name is of the following form: one upper case letter and either one or more lower case letters or one period "."; (ii) a middle initial is of the following form: one upper case letter and one period; and (iii) a last name is of the following form: one upper case letter and one or more lower case letters.

FULL_NAME::=FIRST_NAME LAST_NAME|
FIRST_NAME MID_IN LAST_NAME
FIRST_NAME::=\u((\l)*|.)
MID_IN::=\u.
LAST_NAME::=\u(\l)*

Other wildcard characters are possible as well, as well as variations on those discussed above.

By implementing regular expressions in extended BNF rules, the parser can more efficiently parse and match certain words or other strings, such as dates, names, and zip codes, among many other examples. Without such extended BNF rules, more rules might be required to parse and match such words and/or strings. For example, regular expressions in a BNF rule to match any three-digit number followed by a lowercase letter can take the following form:

THREE_DIGITS_AND_LETTER::=\d\d\d\l

In comparison, BNF rules without regular expressions to match any three-digit number followed by a lowercase letter can take the following form:

THREE_DIGITS::=DIGIT DIGIT DIGIT LOWER_CASE
DIGIT::=0|1|2|3|4|5|6|7|8..9
LOWER_CASE::=a|b|c|d|e|f|g|h|i|j|k|l|m-|n|o|p..q|r|s|t|u|v|w|x|y|z

In some implementations, one or more rules of the set of extended BNF rules can include a Boolean expression having at least one operator other than an OR operator, such as a NOT operator, an AND operator, or both a NOT operator and an OR operator.

An extended BNF rule including an AND operator can be useful, for example, in situations in which it might not be desirable for at least a portion of the query to be interpreted on a term by term basis. As an example, the parser might be configured by default to interpret the query "New York meetup" on a term by term basis, and thus might not be able to identify two different interpretations of "New York." Rather, "New York" might be interpreted as two separate terms, "New" and "York." Thus, an extended BNF rule having an AND operator can allow for seamless joining of complete words, such as "New York," when desired. Consider the following example extended BNF rules, which use an AND operator, &, as well as underscores as wildcard characters.

CITY::=san francisco|new york|seattle
ONE_TERM_CITY::=CITY & (_)
TWO_TERMS_CITY::=CITY & (_ _)

In this set of rules, the single underscore character in the parenthesis in the ONE_TERM_CITY rule can be used to match queries with one-word cities, such as Seattle. Whereas, the double underscore characters, separated by a space, in the parenthesis in the TWO_TERMS_CITY rule can be used to match queries with two-word cities, such San Francisco or New York. Other examples are possible as well.

Furthermore, an extended BNF rule including a NOT operator can be useful in certain situations, such as when words have multiple meanings. In these and other situations, the NOT operator can be used to prevent certain terms from being interpreted in ways that might be undesirable in certain contexts. For example, the word "nice" can be interpreted as a city (namely, the city of Nice, France) or as a descriptive word. Thus, for the example query, "Milan is nice," the term nice can be interpreted as the city or a descriptive word describing the city of Milan. To assist with a desired interpretation of the query, an extended BNF rule can include a NOT operator. For example, consider the following seven rules, the last of which including a NOT operator, ~.

EURO CITY::=milan|venice|nice
US_CITY::=san francisco|new york|seattle
VERB::=is|was
STOP WORDS::=beautiful|wonderful|EURO_AMBIGUOUS
EURO_AMBIGUOUS::=nice
US_CITY_DESCRIPTION::=US_CITY VERB STOP_WORDS
EURO_CITY_DESCRIPTION::=EURO_CITY VERB (STOP_WORDS & ~EURO_AMBIGUOUS)

In effect, the rules in this example can match the query in different ways, depending on whether the city in the query is a U.S. city or a European city. More particularly, using these rules, the parser can match queries that have the descriptive word "nice" being used to describe a U.S. city, but might not match queries that use the word "nice" to describe a European city, due to the possible confusion with the European city of Nice, France. Other examples are possible as well. By preventing the parser from interpreting terms in undesired manners, the efficiency of parsing, and thus the search as a whole, can be improved.

In accordance with example embodiments, once computing device 700 has parsed the query using the set of extended BNF rules, computing device 700 can generate a query object (e.g., in SQL form), search database 704, database 712, another database, or the Internet using the query object as a search query, and transmit a result to client device 710.

In practice, parsing of complex NLQs may be computationally expensive. Further, in the context of a large network and/or enterprise, the number of NLQs needing parsing may be large. In accordance with example embodiments, the processing described in connection with the example system shown in FIG. 7—namely that done by the computing device 700—may be divided between a computing device in a computational instance and a separate server device in the remote network management platform.

Figure 8:
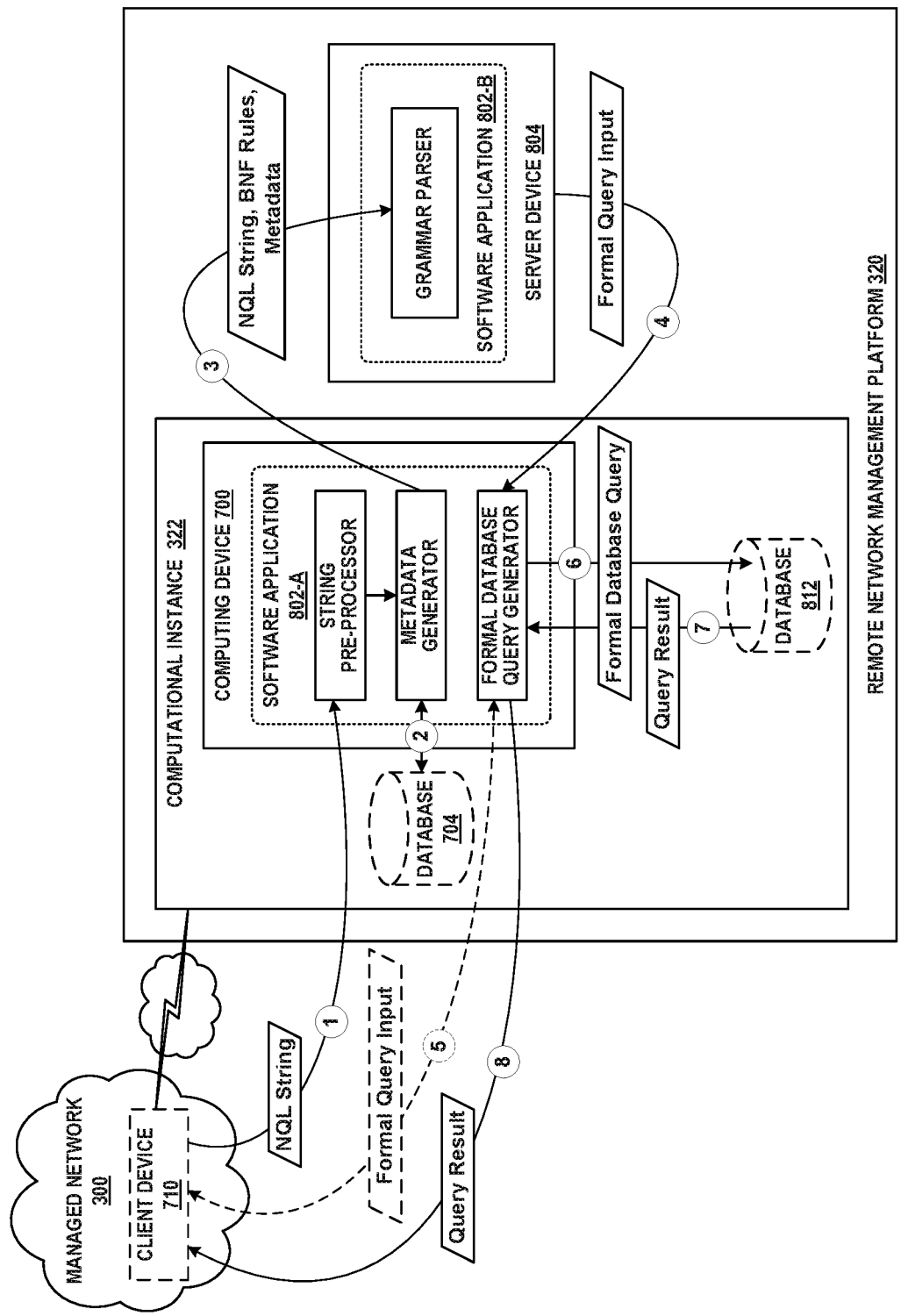
FIG. 8 depicts an example architecture for a natural query language processing system and showing example operation, in accordance with example embodiments.

FIG. 8 depicts an example architecture for an NLQ processing system in which the computational burden of actual parsing may be removed from the computational instance and taken on by a server device of the remote network management platform. The format of FIG. 8 also displays example operational flow as well. In particular, FIG. 8 depicts an implementation in which an NLQ is received and pre-processed by computing device 700 of the computational instance 322. The computing device 700 also generates metadata, which may be thereafter cached for future NLQs. However, in the example illustrated in FIG. 8, parsing is carried out by as separate server device in the remote network management platform 320.

In addition to the remote network management platform, FIG. 8 also depicts a managed network 320 that includes a client device 710. For the sake of brevity in the figure, other elements of the managed network 320 have been omitted. For purposes of illustration, the computational instance 322 includes two databases: database 704 and database 812, in addition to the computing device 700. Each database may contain data for different aspects of NLQ parsing and processing. Specifically, and by way of example, the database 812 may include management data that are subject to search and analysis, as specified or requested in user NLQs for example. These are the data that users may be interested in examining and/or analyzing. The database 704 my include data used by the NLQ parsing operations, such as metadata describing the schema of the database 812, and metadata that record synonyms and sematic shortcuts. It will be appreciated that the separation in FIG. 8 of the two types of data into distinct database is meant to highlight the different types and roles of the data. In other implementations, both types of data could be stored and managed in the same physical database.

In accordance with example embodiments, the computational instance 322 of the remote network management platform 320 may implement a software application 802-A, and the server device 804 of the remote network management platform 320 may implement a software application 802-B. Each of the software application may include functional modules or components that are configured to carry out different aspects of NLQ parsing and processing. Specifically, the software application 802-A is shown to include a string pre-processor, a metadata generator, and a formal database query generator. The software application 802-B is shown to include a grammar parser. Each of the functional components or modules may be implemented as executable instructions stored in one or another form of memory (e.g., non-transient computer-readable media). When the instructions are executed by one or more processors of the computing device 700 and/or the server device 804, the computing device and/or server device may then carry out operations of the functional components or modules.

Operation of NLQ processing may be described by way of example, as illustrated in FIG. 8 by enumerated arrows indicating example actions and information flow. The example operational actions and flow illustrated is not intended to be limiting, but rather represents one descriptive scenario of NLQ parsing and processing in accordance with embodiments herein.

Operation may be being with user query entered at client device and transmitted to the computing device 700, as indicated by the arrow labeled "1." In the example illustrated, the user query may be entered as text by way of a keyboard device, for example. In this scenario, the query may be entered as a text string. In another example, the query may be a spoken utterance that is converted to text by a speech-to-text application on the client device or some other audio input device communicatively connected to the client device. In either scenario, a query text string corresponding to the user query may be transmitted to the computing device 700.

As shown, the NLQ string may be received by the string pre-processor module, where various aspects of string pre-processing may be carried out. As indicate above, these may include determining individual words and/or phrases of the NLQ string, correcting evident typographical errors, and classifying the NLQ according to recognized terms, for example. In addition, pre-processing of the NLQ string may be used to evaluate one or more BNF rules applicable to the query. This may involve recognizing terms corresponding to tables, columns, filters, and other possible schema components.

Next, the metadata generator module may access the database 704 to retrieve one or more BNF rules applicable to the NLQ, and also to retrieve metadata associated with the retrieved BNF rules, as indicated by the arrow labeled "2." This operation may include retrieval of metadata descriptive of a schema or schemas of the management data in the database 812. In accordance with example embodiments, BNF rules may be generated upon an initial NLQ that references particular tables, rows of columns of the database 812. Thereafter, the BNF rules may be cached for expedited access and retrieval for future NLQs relating to the schema. As indicated, the metadata descriptive of the schema may be stored in one or more JSON format files. Similarly, metadata for synonyms and/or semantic shortcuts may be retrieved and/or generated by the metadata generator.

Once the BNF rules and metadata are retrieved and/or generated, the NLQ string, BNF rules, and the metadata may be forwarded or transmitted to the software application 802-B implemented in the server device 803, as indicated by the arrow labeled "3." The grammar parser may then parse the NLQ, together with the metadata, according to the one or more BNF rules to build a parse tree. As indicated above, this can be a computationally expensive operation, particularly for complex queries that may occur in very large numbers in a large managed network. In accordance with example embodiments, the server device 804 may be dedicated or at least partly dedicated to parsing operations, so that, advantageously, significant computing power and resources may be applied to parsing without imposing undue or excessive computing and/or resource demands on the computing device 700 or more generally on the computational instance 322.

In accordance with example embodiments, the grammar parser may parse the NLQ string according to the BNF rules, using the metadata to substitute rule-compliant terms encountered in the BNF rules during parsing. More particularly, when a metadata term signaling a synonym is encountered, the metadata file containing synonyms may be consulted to match a term in the NLQ with a synonym, and the formal BNF term associated with the match synonym may be substituted into the BNF rule, thereby enabling proper parsing. Similarly, when a metadata term signaling a semantic shortcut is encountered, the metadata file containing sematic shortcuts may be consulted to match a term in the NLQ with a sematic shortcut in the file, and the formal BNF expression associated with the match sematic shortcut may be substituted into the BNF rule, thereby enabling proper parsing.

The parsing operation may generate parsing tree, as described above. The parsing tree may then be analyzed to map the NLQ to formal query input that may be used to construct or generate a formal database query. The formal query input may then be returned to the formal database query generator module of the software application 802-A, as indicated by the arrow labeled "4."

Before generating a formal query, the user may be presented with the formal query input as an optional step, as indicated by the dashed arrow labeled "5." The data may be presented to the user is a user-friendly form that allows the user to check if the user's request, as entered in the NLQ, has been understood by the system. If not, the user may re-enter or revise the NLQ with more precise terms, perhaps using the feedback as guidance. Although not necessarily shown, the process may repeat iteratively until the user is satisfied that the system correctly understands the request. In practice, this may typically take only one or two additional iterations if the first pass parsing failed to yield a proper understand the user's intended query.

Assuming the parsing yields the correct formal query input, either on the first try or a subsequent iteration, the formal database query generator module may then generate or construct a formal database query, also referred to herein as a "query object." As noted above, this term, in particular "object," captures the complex formal structure that is typical of a formal query language, such as multiple fields and/or nested structures. The formal query may then be submitted to the database 812, as indicated by the arrow labeled "6."

The formal query result is returned from the database 812 to the formal database query generator, as indicated by the arrow labeled "7." The query result is then transmitted to the client device, as indicated by the arrow labeled "8." The result may first be processed for presentation in a user-friendly form, such as in graphical display. The user may then view and/or analyze the returned data.

Figure 9:
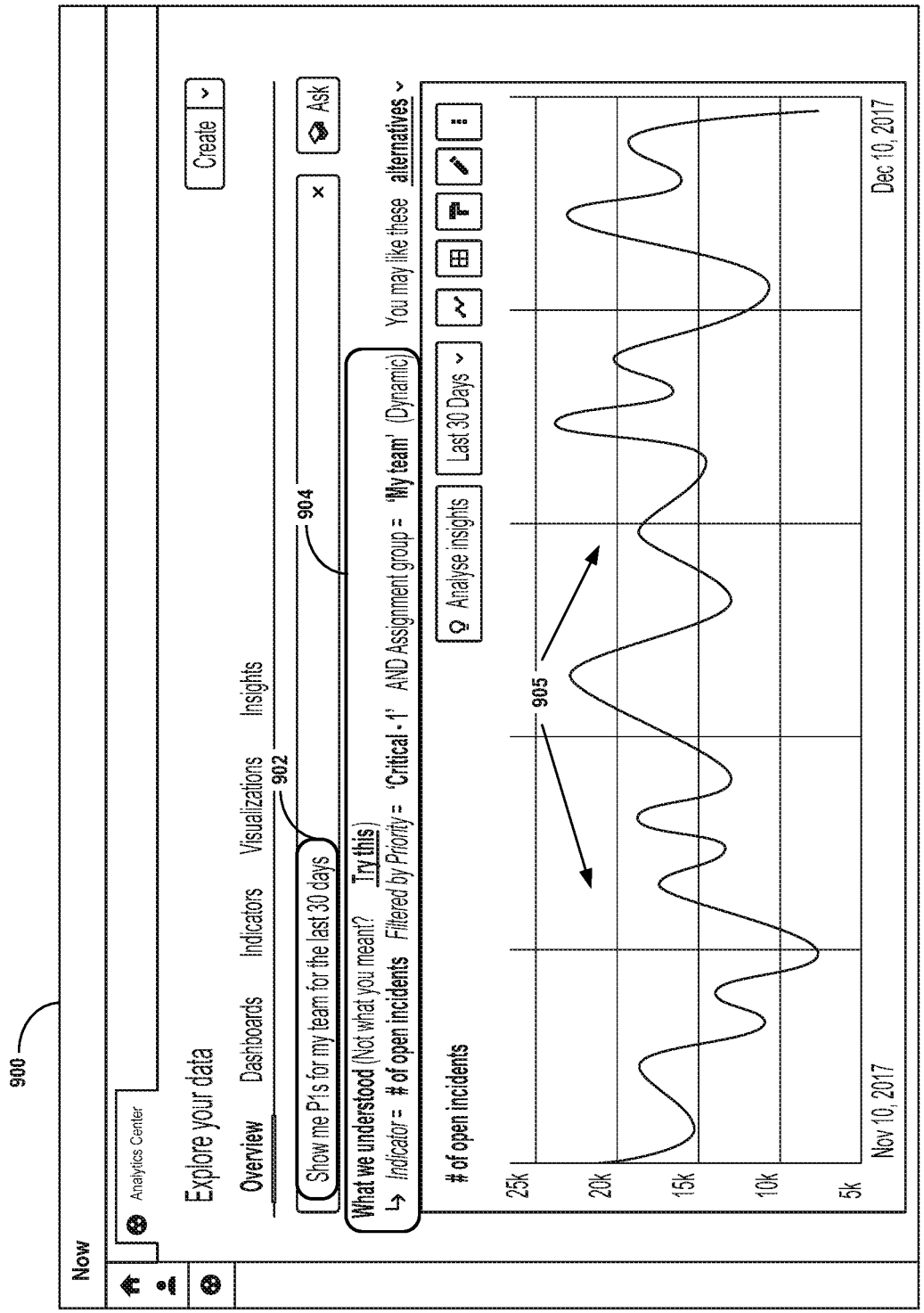
FIG. 9 depicts an example graphical user interface (GUI) including an example natural query language, query suggestions, and query results, in accordance with example embodiments.

FIG. 9 depicts an example GUI 900 that includes a query 902 and query suggestion 904, that computing device 700 can generate and provide for display at client device 710. As represented in this illustration, a user may enter a NLQ at the client device 710 as "Show me P1s for my team for the last 30 days." Upon parsing this query, as described above, a suggestion of what the grammar parser understood the query to mean is displayed as "What we understood . . . " and presents formal query terms "# of open incidents filtered by priority 'critical –1 AND Assignment group='My team'." In this example, it is assumed that the user deems this interpretation to be correct, so a formal query is generated and the result returned and displayed in the graphical form 905 as shown.

The illustration of FIG. 9 also indicates how synonyms and sematic shortcuts may be applied. For example, the term "p1" may be used as a sematic shortcut for the phrase "priority=1." As such, a user does not need to know or be required to enter the formal phrase, but rather may use the more informal term "p1." During parsing, the grammar parser module may encounter in a BNF rule a link to metadata file in which "p1" is defined to be "priority=1," and thus may be replaced with "priority=1," which enables proper parsing and proper generation of a formal query. Similarly, term "incidents" may be determined to be a synonym of a "incidents table" in the database 812.

The use of synonyms and sematic shortcuts thus enables a user to enter NLQs that may be properly interpreted during parsing in accordance with BNF rules.

VII. EXAMPLE OPERATIONS

Figure 10:
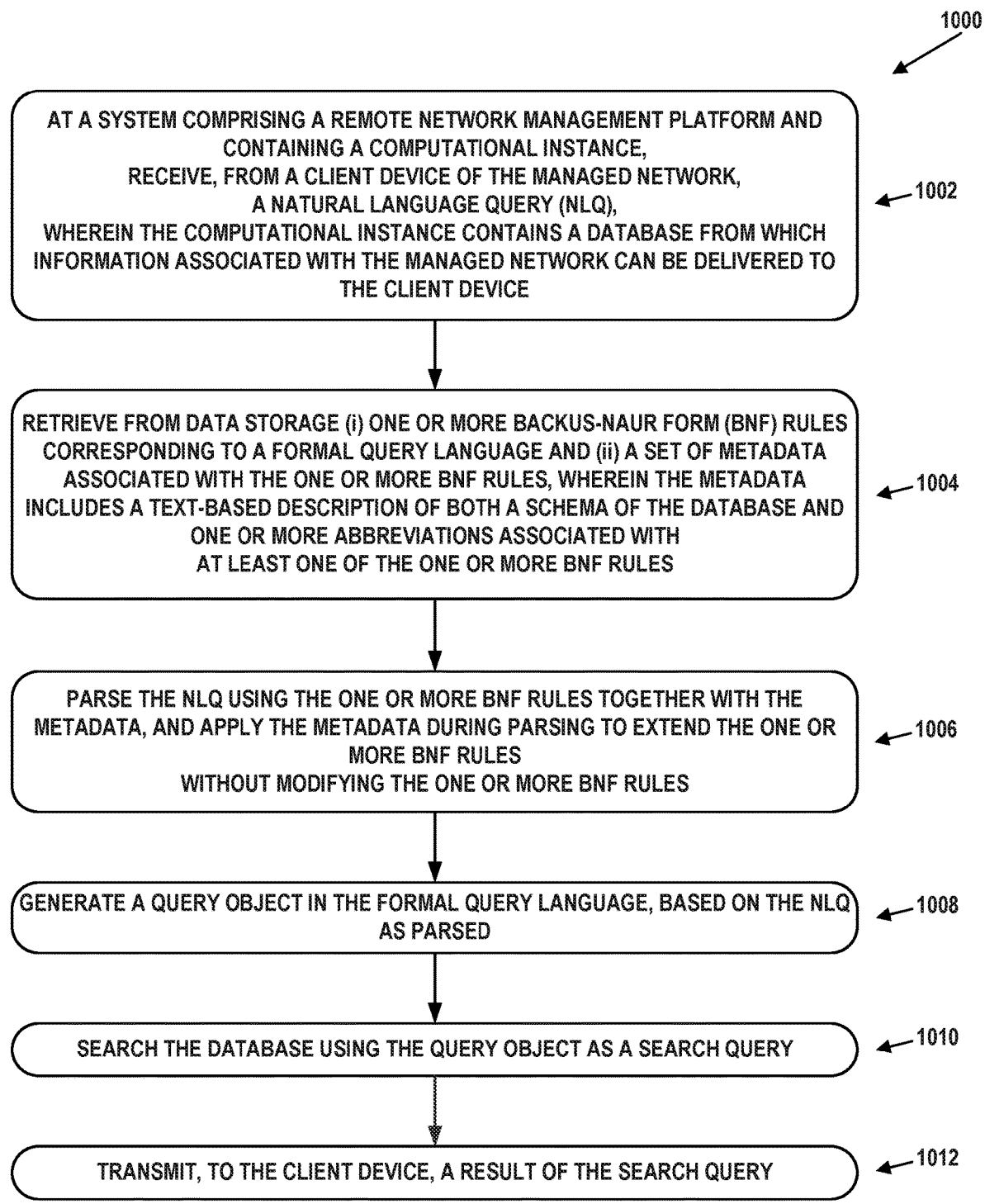
FIG. 10 is a flow chart, in accordance with example embodiments.

FIG. 10 is a flow chart illustrating an example method 1000, in accordance with example embodiments. The example method 1000 may be carried out by a one or more computing devices, such as computing device 100, and/or a cluster of computing devices, such as server cluster 200. For the purposes of example, the process illustrated by FIG. 10 will be described as being carried out by a software application or applications, such as software applications 802-A and 802-B, that are executable on computing device 700 of computational instance 322 and computing device 804 of remote network management platform 320. However, the process can be carried out by other types of devices or device subsystems. For example, the process could be carried out by a portable computer, such as a laptop or a tablet device.

In the context of the present discussion, the remote network management platform and the computational instance of the platform, including a computing device of the computational instance and a server device of the remote network management platform, may be referred to concisely as a "system." As such, system may be considered as being configured to carry out the example method 1000.

In accordance with example embodiments, the computational instance of the remote network management platform may be configured for managing a managed network, such as managed network 300. The managed network may contain a client device, such as client device 302 or 710, for example. A user in the managed network may enter a query in the form of a NLQ at the client device in order to search or access managed data of the managed network. The managed data by be stored/managed in a database contained in, or part of, the computational instance that is associated with the managed network. As such, the database may be considered as contain information associated with the managed network, and that can be delivered to the client device.

In accordance with example embodiments, the software applications may be implemented as instructions stored in computer-readable memory, such as non-transient computer-readable media. When the instructions are executed by one or more processors of the one or more computing devices of the system, the one or more computing devices of the system may be caused to carry out the example method 1000.

The embodiments of FIG. 10 may be simplified by the removal of any one or more of the features shown therein. Further, these embodiments may be combined with features, aspects, and/or implementations of any of the previous figures or otherwise described herein.

Block 1002 involves receiving a natural language query (NLQ) from a client device of the managed network. As described, the NLQ may be for management data of the managed network, and directed to a database of the computational instance.

Block 1004 involves retrieving from data storage associated with the computational instance (i) one or more Backus-Naur form (BNF) rules corresponding to a formal query language and (ii) a set of metadata associated with the one or more BNF rules. The metadata may include a text-based description of both a schema of the database and one or more abbreviations associated with at least one of the one or more BNF rules. The data storage could be the database that also stores/manages the managed data of the network, or it could be a separate database for BNF rules and metadata.

Block 1006 involves parsing the NLQ using the one or more BNF rules together with the metadata. In particular, the metadata may be applied during parsing to extend the one or more BNF rules without modifying the one or more BNF rules.

Block 1008 involves generating a query object in the formal query language, based on the NLQ as parsed. In accordance with example embodiments, query object may be a formal database query expressed in a formal query language, such as SQL.

Block 1010 involves searching the database using the query object as a search query. The search may locate and/or identify data in the database according to the formal query, which may specify tables, rows, and/or columns, as well as search criteria or conditions, data filters, or other search parameters.

Block 1012 involves transmitting, to the client device, a result of the search query. The search result may then be presented in a display of the client device, for example.

In accordance with example embodiments, parsing the NLQ may entail determining a set of query information for generating the query object. As described above, this may involve creating a parse tree according to the BNF rules and metadata, and mapping tree to search terms, criteria, and parameters, for example.

In accordance with example embodiments, the one or more abbreviations associated may correspond to one or more lists of query-term synonyms, or one or more lists of semantic shortcuts. As described above, a given query-term synonym may be considered a term that is an equivalent substitution for a formal term of at least one of the one or more BNF rules. Similarly, a given sematic shortcut is a term that may be considered an equivalent substitution for a formal parameter-value specification of at least one of the one or more BNF rules.

In further accordance with example embodiments, applying the metadata during parsing may entail identifying a metadata indicator in the at least one of the one or more BNF rules, and replacing the metadata indicator in the at least one of the one or more BNF rules formal term equivalent to a query-term synonym appearing in the NLQ. Additionally or alternative, the metadata indicator may be replace by a formal parameter-value specification equivalent to a sematic shortcut appearing in the NLQ. In an example embodiment, a metadata indicator may be a pointer or a link to a metadata file containing query-term synonyms and/or sematic shortcuts.

In accordance with example embodiments, applying the metadata during parsing may entail detecting in at least one of the one or more BNF rules of one or more pointers to a metadata file, and substituting the one or more pointers in the at least one of the one or more BNF rules with metadata from the metadata file.

In accordance with example embodiments, the schema of the database may be a schema for data corresponding to the information associated with the managed network.

In accordance with example embodiments, the one or more computing devices of the system be a computing device of the computational instance and a separate server device of the remote network management platform. For this arrangement, receiving the NLQ may entail receiving the NLQ by the computing device, and retrieving the BNF rules and metadata may entail retrieving the BNF rules and metadata by the computing device. In addition, the method may further entail the computing device providing the NLQ, the BNF rules, and the metadata to the server device. In this case, parsing the NLQ may entail parsing the NLQ by the server device.

In accordance with example embodiments, the data storage may be in the database. For this arragnement, retrieving (i) the one or more Backus-Naur form (BNF) rules corresponding to the formal query language and (ii) the set of metadata associated with the one or more BNF rules may entail retrieving both (i) the one or more Backus-Naur form (BNF) rules corresponding to the formal query language and (ii) the set of metadata associated with the one or more BNF rules from the database.

In accordance with example embodiments, receiving the NLQ may entail receiving one of a text string, or an audio recording of a spoken utterance. For this scenario, the method may further entail translating the spoken utterance in a text string if the NLQ is received as an audio recording of the spoken utterance.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    a remote network management platform associated with a managed network and containing a computational instance, wherein the managed network comprises a client device, and wherein the computational instance contains a database from which information associated with the managed network is delivered to the client device;
    a software application, executable on one or more computing devices of the system, and configured to cause the one or more computing devices to:
        receive, from the client device, a natural language query (NLQ);
        retrieve from data storage associated with the computational instance (i) one or more Backus-Naur form (BNF) rules corresponding to a formal query language and (ii) metadata associated with the one or more BNF rules, wherein the metadata includes a text-based description of both a schema of the database and one or more abbreviations associated with at least one of the one or more BNF rules;
        parse the NLQ using the one or more BNF rules together with the metadata, wherein the metadata is applied during parsing to extend the one or more BNF rules without modifying the one or more BNF rules;
        generate a query object in the formal query language, based on the NLQ as parsed;
        search the database using the query object as a search query; and
        transmit, to the client device, a result of the search query.

2. The system of claim 1, wherein an output of the parsing of the NLQ is a set of query information for generating the query object.

3. The system of claim 1, wherein the one or more abbreviations associated with the at least one of the one or more BNF rules comprise at least one of: one or more lists of query-term synonyms, or one or more lists of semantic shortcuts,
    wherein a given query-term synonym is a term that is an equivalent substitution for a formal term of at least one of the one or more BNF rules,
    and wherein a given sematic shortcut is a term that is an equivalent substitution for a formal parameter-value specification of at least one of the one or more BNF rules.

4. The system of claim 3, wherein the metadata is applied during parsing by an operation that includes replacing a metadata indicator in the at least one of the one or more BNF rules with at least one of (i) a formal term equivalent to a query-term synonym appearing in the NLQ, or (ii) a formal parameter-value specification equivalent to a sematic shortcut appearing in the NLQ.

5. The system of claim 1, wherein the metadata is applied during parsing by an operation that includes:
    detection, in at least one of the one or more BNF rules, of one or more pointers to a metadata file; and
    responsive to the detection, substitution of the one or more pointers in the at least one of the one or more BNF rules with additional metadata from the metadata file.

6. The system of claim 1, wherein the schema of the database comprises a schema for data corresponding to the information associated with the managed network.

7. The system of claim 1, wherein the one or more computing devices of the system comprise a computing device of the computational instance and a separate server device of the remote network management platform,
- wherein the computing device is configured to:
  - receive the NLQ,
  - retrieve the BNF rules and the metadata, and
  - provide the NLQ, the BNF rules, and the metadata to the server device;
- and wherein the server device is configured to carry out the parsing.

8. The system of claim 1, wherein the data storage is in the database.

9. The system of claim 1, wherein the NLQ is received as one of a text string, or an audio recording of a spoken utterance,
- and wherein, if received as an audio recording of a spoken utterance, the one or more computing devices is further configured to translate the spoken utterance to a text string.

10. A method performed by a software application executable on one or more computing devices of a system comprising a remote network management platform associated with a managed network and containing a computational instance, the method comprising:
- receiving, from a client device of the managed network, a natural language query (NLQ), wherein the computational instance contains a database from which information associated with the managed network is delivered to the client device;
- retrieving from data storage associated with the computational instance (i) one or more Backus-Naur form (BNF) rules corresponding to a formal query language and (ii) metadata associated with the one or more BNF rules, wherein the metadata includes a text-based description of both a schema of the database and one or more abbreviations associated with at least one of the one or more BNF rules;
- parsing the NLQ using the one or more BNF rules together with the metadata, and applying the metadata during parsing to extend the one or more BNF rules without modifying the one or more BNF rules;
- generating a query object in the formal query language, based on the NLQ as parsed;
- searching the database using the query object as a search query; and
- transmitting, to the client device, a result of the search query.

11. The method of claim 10, wherein parsing the NLQ comprises determining a set of query information for generating the query object.

12. The method of claim 10, wherein the one or more abbreviations associated with the at least one of the one or more BNF rules comprise at least one of: one or more lists of query-term synonyms, or one or more lists of semantic shortcuts,
- wherein a given query-term synonym is a term that is an equivalent substitution for a formal term of at least one of the one or more BNF rules,
- and wherein a given sematic shortcut is a term that is an equivalent substitution for a formal parameter-value specification of at least one of the one or more BNF rules.

13. The method of claim 12, wherein applying the metadata during parsing comprises:
- identifying a metadata indicator in the at least one of the one or more BNF rules; and
- replacing the metadata indicator in the at least one of the one or more BNF rules with at least one of (i) a formal term equivalent to a query-term synonym appearing in the NLQ, or (ii) a formal parameter-value specification equivalent to a sematic shortcut appearing in the NLQ.

14. The method of claim 10, wherein applying the metadata during parsing comprises:
- detecting, in at least one of the one or more BNF rules, one or more pointers to a metadata file; and
- substituting the one or more pointers in the at least one of the one or more BNF rules with additional metadata from the metadata file.

15. The method of claim 10, wherein the schema of the database comprises a schema for data corresponding to the information associated with the managed network.

16. The method of claim 10, wherein the one or more computing devices of the system comprise a computing device of the computational instance and a separate server device of the remote network management platform,
- wherein receiving the NLQ comprises receiving the NLQ by the computing device,
- wherein retrieving the BNF rules and the metadata comprises retrieving the BNF rules and the metadata by the computing device,
- wherein the method comprises the computing device providing the NLQ, the BNF rules, and the metadata to the server device,
- and wherein parsing the NLQ comprises parsing the NLQ by the server device.

17. The method of claim 10, wherein the data storage is in the database,
- and wherein retrieving (i) the one or more Backus-Naur form (BNF) rules corresponding to the formal query language and (ii) the metadata associated with the one or more BNF rules from data storage associated with the computational instance comprises:
  - retrieving both (i) the one or more Backus-Naur form (BNF) rules corresponding to the formal query language and (ii) the metadata associated with the one or more BNF rules from the database.

18. The method of claim 10, wherein receiving the NLQ comprises receiving one of a text string, or an audio recording of a spoken utterance,
- and wherein the method further comprises translating the spoken utterance to a text string if the NLQ is received as an audio recording of the spoken utterance.

19. An article of manufacture including a non-transitory computer-readable medium, having stored thereon program instructions that, upon execution by one or more computing devices of a system comprising a remote network management platform associated with a managed network and containing a computational instance, cause the system to perform operations comprising:
- receiving, from a client device of the managed network, a natural language query (NLQ), wherein the computational instance contains a database from which information associated with the managed network is delivered to the client device;
- retrieving from data storage associated with the computational instance (i) one or more Backus-Naur form (BNF) rules corresponding to a formal query language and (ii) metadata associated with the one or more BNF rules, wherein the metadata includes a text-based description of both a schema of the database and one or more abbreviations associated with at least one of the one or more BNF rules;

parsing the NLQ using the one or more BNF rules together with the metadata, and applying the metadata during parsing to extend the one or more BNF rules without modifying the one or more BNF rules;

generating a query object in the formal query language, based on the NLQ as parsed;

searching the database using the query object as a search query; and transmitting, to the client device, a result of the search query.

20. The article of manufacture of claim 19, wherein the one or more computing devices of the system comprise a computing device of the computational instance and a separate server device of the remote network management platform, wherein execution of the program instructions by the one or more computing devices comprises execution of the program instructions on at least the computing device and the server device, wherein receiving the NLQ comprises receiving the NLQ by the computing device, wherein retrieving the BNF rules and the metadata comprises retrieving the BNF rules and the metadata by the computing device, wherein the operations further comprise the computing device providing the NLQ, the BNF rules, and the metadata to the server device, and wherein parsing the NLQ comprises parsing the NLQ by the server device.

* * * * *